(12) United States Patent
Mueller et al.

(10) Patent No.: US 7,553,352 B2
(45) Date of Patent: Jun. 30, 2009

(54) METHOD FOR THE CONTROLLED STORAGE AND RELEASE OF GASES USING AN ELECTROCHEMICALLY PRODUCED CRYSTALLINE, POROUS, ORGANOMETALLIC SKELETON MATERIAL

(75) Inventors: Ulrich Mueller, Neustadt (DE); Hermann Puetter, Neustadt (DE); Michael Hesse, Worms (DE); Markus Schubert, Ludwigshafen (DE); Helge Wessel, Mannheim (DE); Juergen Huff, Ludwigshafen (DE); Marcus Guzmann, Muehlhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 347 days.

(21) Appl. No.: 10/580,192

(22) PCT Filed: Nov. 24, 2004

(86) PCT No.: PCT/EP2004/013331

§ 371 (c)(1), (2), (4) Date: Dec. 15, 2006

(87) PCT Pub. No.: WO2005/049484

PCT Pub. Date: Jun. 2, 2005

(65) Prior Publication Data

US 2007/0248852 A1     Oct. 25, 2007

(30) Foreign Application Priority Data

Nov. 24, 2003 (DE) ............................. 103 55 087

(51) Int. Cl.
*C01B 3/00* (2006.01)
*H01M 8/04* (2006.01)

(52) U.S. Cl. ............................. 95/90; 95/900; 429/17; 423/248; 502/526

(58) Field of Classification Search .................. 96/108; 95/90, 95, 106, 116, 127, 130, 138–141, 95/143, 144, 147, 900; 429/17; 423/226, 423/230, 239.1, 247, 248; 206/0.7; 502/526
See application file for complete search history.

(56) References Cited

U.S. PATENT DOCUMENTS

| | | | |
|---|---|---|---|
| 5,648,508 A | | 7/1997 | Yaghi |
| 6,491,740 B1 * | | 12/2002 | Wang et al. .................. 95/90 |
| 2005/0124819 A1 * | | 6/2005 | Yaghi et al. .................. 556/148 |

FOREIGN PATENT DOCUMENTS

| | | |
|---|---|---|
| DE | 202 10 139 | 7/2003 |
| DE | 103 55 087 | 6/2005 |
| FR | 2 708 002 | 1/1995 |
| JP | 09 227571 | 9/1997 |
| WO | 02/070526 | 9/2002 |
| WO | 02/088148 | 11/2002 |
| WO | 03/064030 | 8/2003 |

OTHER PUBLICATIONS

Eddaoudi, Mohamed et al., "Systematic Design of Pore Size and Functionality in Isoreticular MOFS and Their Application in Methane Storage", Science, vol. 295, pp. 469-472, 2002.
Chen, Banglin et al., "Interwoven Metal-Organic Framework on a Periodic Minimal Surface with Extra-Large Pores", Science, vol. 291, pp. 1021-1023, 2001.

* cited by examiner

*Primary Examiner*—Frank M Lawrence
(74) *Attorney, Agent, or Firm*—Oblon, Spivak, McClelland, Maier & Neustadt, P.C.

(57) ABSTRACT

The present invention relates to a method of absorbing and/or storing gases, in which the gas to be stored is brought into contact with an electrochemically prepared metal-organic framework under conditions suitable for absorption of the gas, with absorption of the gas into the metal-organic framework occurring, and, if appropriate, the conditions are subsequently changed so that release of the stored gas occurs.

20 Claims, 5 Drawing Sheets

X: Pressure/bar
Y: Equilibrium loading/X%

X: Pressure/bar
Y: Equilibrium loading/X%

X: Pressure/bar
Y: Equilibrium loading/X%

X: Pressure/bar
Y: Equilibrium loading/X%

X: Pressure/bar
Y: Equilibrium loading/X%

METHOD FOR THE CONTROLLED STORAGE AND RELEASE OF GASES USING AN ELECTROCHEMICALLY PRODUCED CRYSTALLINE, POROUS, ORGANOMETALLIC SKELETON MATERIAL

The present invention relates to a method of storing and/or releasing gases in a controlled manner using an electrochemically prepared crystalline, porous metal-organic framework. Here, the metal ion comprised in the framework is at least partly provided by means of anodic oxidation. The electrochemically prepared framework is highly suitable as storage medium for gases.

Crystalline porous metal-organic frameworks (MOFs) having particular pores or pore distributions and large specific surface areas have in recent times in particular become the object of comprehensive research work.

Thus, for example, U.S. Pat. No. 5,648,508 describes microporous metal-organic frameworks which are prepared from a metal ion and a ligand in the presence of a template compound under mild reaction conditions.

WO 02/088148 discloses the preparation of a series of compounds which have the same framework topology. These IRMOFs (isoreticular metal-organic framework) structures are monocrystalline and mesoporous frameworks which have a very high storage capacity for gases.

Eddaoudi et al., Science 295 (2002), 469-472, describe, for example, the preparation of an MOF-5, in which a zinc salt, viz. zinc nitrate, is used as starting material and this salt and 1,4-benzenedicarboxylic acid (BDC) are dissolved in N,N'-diethylformamide (DEF) to synthesize the MOF.

Chen et al., Science 291 (2001), 1021-1023, describe, for example, the preparation of an MOF-14, in which a copper salt, viz. copper nitrate, is used as starting material and this salt and 4,4',4"-benzene-1,3,5-triyltribenzoic acid ($H_3BTC$) are dissolved in N,N'-dimethylformamide (DMF) and water to synthesize the MOF.

Accordingly, the processes described in the prior art for preparing these porous metal-organic frameworks are all ones in which the metal ion to which the ligands are coordinated is provided via a corresponding metal salt solution and in any case a solution which comprises the dissolved metal salt is brought into contact with a ligand in the presence of a suitable template compound.

This procedure has safety problems since, for example, in the preparation of copper-comprising metal-organic frameworks, not only copper ions but in many cases also nitrate anions which are introduced into the reaction system via the copper salt are present in the solution. The synthesis then results in high-surface-area metal complexes in concentrated, nitrate-comprising phases in which organic solvents are also comprised. Such phases can decompose spontaneously on overheating.

If, on the other hand, a solution based on halides, as is likewise described in many cases in the prior art, is used instead of a nitrate-comprising metal salt solution, this leads in industrial use to rapid corrosion of components of apparatus, which is why expensive corrosion-resistant materials are required.

To avoid the disadvantages described, the applicant has developed a process for the electrochemical preparation of MOFs, which is subject matter of the German patent application 103 55 087.5 of Nov. 24, 2003 having the title "Verfahren zur elektrochemischen Herstellung eines kristallinen porösen metallorganischen Gerüstmaterials".

The process described therein takes a completely different approach in which the metal ion to which the ligand of the framework is coordinated is provided not via a metal salt but by electrochemical means. The at least one metal ion in the metal-organic framework is therefore introduced into the reaction system at least partly by means of anodic oxidation.

The abovementioned patent application relates to a process for the electrochemical preparation of a crystalline porous metal-organic framework comprising at least one at least bidentate organic compound coordinated to at least one metal ion in a reaction medium comprising the at least one bidentate organic compound, wherein at least one metal ion is provided in the reaction medium by oxidation of at least one anode comprising the corresponding metal.

The storage of gases using metal-organic frameworks (MOFs) is subject matter of the patent application WO 03/064030. This application describes the storage of various gases including $H_2$, $CH_4$, noble gases and the like using metal-organic frameworks. Metal-organic frameworks are well suited to absorbing gases as a result of their high internal surface area, and release of the gases is also possible.

However, the method of the abovementioned patent application using conventional metal-organic frameworks has the disadvantage that the anions originating from the starting materials, e.g. $NO_3^-$ or $Cl^-$, are still present in the MOF and the storage properties are adversely affected as a result, for instance due to interactions. In particular, the storage capacity of the materials is reduced as a result, since free storage sites are occupied.

It is therefore an object of the present invention to provide a method in which the abovementioned disadvantages are avoided. It should preferably be possible to improve the method of WO 03/064030 so that no interactions between the stored gases and the anions occur. In particular, the storage capacity of the MOFs should be optimized, i.e. a storage method having maximum storage capacity is to be made available.

The applicant has now found that the metal-organic frameworks prepared according to the German patent application 103 55 087.5, which are themselves novel and differ from the corresponding metal-organic frameworks prepared by wet chemical means, are highly suitable for the storage and/or release of gases.

This object is achieved by a method of absorbing and/or storing gases, in which the gas to be stored is brought into contact with an electrochemically prepared metal-organic framework under conditions suitable for absorption of the gas, with absorption of the gas into the metal-organic framework occurring, and, if appropriate, the conditions are subsequently changed so that release of the stored gas occurs.

The method of the invention makes effective storage of large amounts of gases possible.

The term "MOF" used in the context of the present patent application is equivalent to the term "metal-organic framework". These terms thus in each case refer to the polymer obtained after the preparation and after removal of impurities, which is made up of metal ions and bridging ligands and may still comprise impurities which cannot be removed by purification, for example anions originating from the synthesis. The MOF comprises no further accompanying substances or auxiliaries, for instance binders, lubricants and extrusion aids which have been used in the processing of the MOFs to produce, for example, tablets or extrudates.

The method of the invention is suitable for storing substances which are preferably gaseous at room temperature. However, it is also possible to store materials having a boiling point above room temperature. In this case, the storage procedure is generally carried out by bringing the material to be stored into the gas phase if necessary and bringing it into contact in the gaseous state with the MOF under suitable conditions. The stored gas can subsequently also be kept at temperatures at which this is once again present as a liquid. To release the stored medium, it may be necessary to heat again to a temperature at which this is present in gaseous form.

The method of the invention is suitable in principle for the storage and/or release of all chemical compounds which are in gaseous form to about room temperature, but also above room temperature. It is possible to store a single compound or a mixture of two or more compounds. Examples include saturated and unsaturated hydrocarbons, saturated and unsaturated alcohols, oxygen, nitrogen, noble gases (Ne, Ar, Kr, Xe, Rn), CO, $CO_2$, synthesis gas (in general $CO/H_2$) and also natural gases of all possible compositions. The absorbed gas can also comprise compounds which generate the gases which are subsequently released by the MOF.

Gases which are preferred for the purposes of the present invention comprise $H_2$; $H_2$-comprising gas mixtures; $H_2$-producing or -releasing compounds; methane, ethane, propane, butanes, ethylene, propylene, acetylene, Ne, Ar, Kr, Xe, $CO_2$ and $CO_2$. Particular preference is given to $H_2$, $CH_4$, Kr, Xe, $CO_2$, CO.

When the term "storage" of one or more gases is used in the context of the present patent application, this refers to a process in which the gas comes into contact with the MOF, penetrates into the voids present therein and is adsorbed. In this way, the gas is stored. After this storage, the MOF laden with the gas can, if appropriate, be kept for a period of time before "release" of the gas or the gas mixture occurs.

As mentioned above, the storage is generally carried out at a temperature at which the compound or mixture of compounds to be stored is present in gaseous form. The storage is preferably carried out at a temperature of from 0 to 100° C., in particular from 10 to 30° C. Furthermore, the storage of the gas or the gas mixture is generally effected at a pressure above atmospheric pressure, preferably from 1 to 300 bar (absolute), in particular from 1 to 150 bar (absolute), more preferably from 1 to 80 bar (abs), even more preferably in the range from 45 to 80 bar and in particular in the range from 50 to 80 bar (abs).

In the storage and/or release according to the invention, the MOF is generally present in a gastight container. At the end of the storage process, the container accommodating the MOF has an internal pressure which corresponds to the previously applied external pressure. The MOF taking up the gas or gas mixture is therefore also under an external pressure. To release the gas or gas mixture, the pressure acting on the MOF is generally reduced, usually by opening the container accommodating the MOF. To effect the release of the stored gas/gas mixture, it is also possible to heat the MOF. This can occur in addition to the pressure reduction, but also as sole measure, particularly in cases in which the pressure acting on the MOF is not higher than atmospheric pressure.

The present invention thus also comprises a gastight container accommodating an MOF material, an opening through which the gas to be stored can enter and a closure mechanism by means of which the interior or the container can be kept under pressure.

Such containers can, for example, be used in the context of a fuel cell which is used for storing and releasing energy in apparatuses in which supply of external energy is not possible or not desirable and is therefore not employed. This is the case, for example, in the operation of stationary, mobile and/or portable systems or applications. Examples are power stations, motor vehicles such as passenger cars, goods vehicles and buses, and cable-less applications in electronics, e.g. mobile telephones or laptops.

This container can in principle have any suitable geometry. Due to the low pressures which are possible according to the invention, containers which deviate from the standard cylindrical geometry and the respective requirements, for example to be able to be adapted to the specific space available in automobile construction, are preferably also possible. As a result, the containers which can be configured variable can be adapted to hollow spaces of an automobile which can otherwise not be utilized and valuable storage and usable space can be gained.

The electrochemically prepared MOFs which are used according to the invention for storage are described in more detail below.

MOFs are made up of metal ions which are joined to one another via at least bidentate organic compounds so that a three-dimensional structure having internal voids (pores) is formed. The pores are defined by the metal atoms and the organic compounds connecting them. An MOF can have exclusively the same metal ions or can have two or more different metal ions.

The term "electrochemical preparation" here refers to a method of preparation in which the formation of at least one reaction product is associated with the migration of electric charges or the occurrence of electric potentials.

The term "at least one metal ion" here refers to embodiments in which at least one ion of a metal or at least one ion of a first metal and at least one ion of at least one second metal which is different from the first metal is provided by anodic oxidation.

Accordingly, electrochemically prepared MOF materials also comprise embodiments in which at least one ion of at least one metal is provided by anodic oxidation and at least one ion of at least one metal is provided via a metal salt, with the at least one metal in the metal salt and the at least one metal which is provided as metal ion by means of anodic oxidation being able to be identical or different. This is, for example, an embodiment in which the reaction medium comprises one or more different salts of a metal and the metal ion comprised in this salt or in these salts is additionally provided by anodic oxidation of at least one anode comprising this metal. This is likewise an embodiment in which the reaction medium comprises one or more different salts of at least one metal and at least one metal which is different from these metals is provided as metal ion by means of anodic oxidation in the reaction medium.

In a preferred embodiment, the at least one metal ion is provided by anodic oxidation of at least one anode comprising this at least one metal and no further metal is provided via a metal salt.

An embodiment in which the at least one anode comprises a single metal or two or more metals and when the anode comprises a single metal, this metal is provided by anodic oxidation and when the anode comprises two or more metals, at least one of these metals is provided by anodic oxidation is thus comprised.

Furthermore, an embodiment in which at least two anodes which can be identical or different are used, is comprised. Each of the at least two anodes can comprise a single metal or two or more metals. It is possible, for example, for two different anodes to comprise the same metals but in different proportions. It is likewise possible, for example, in the case of different anodes for a first anode to comprise a first metal and a second anode to comprise a second metal, with the first anode not comprising the second metal and/or the second anode not comprising the first metal.

The term "metal" comprises all elements of the Periodic Table which can be provided in a reaction medium by an electrochemical route involving anodic oxidation and are able to react with at least one at least bidentate organic compound to form at least one porous metal-organic framework.

For the purposes of the present invention, particular preference is given to elements of groups Ia, IIa, IIIa, IVa to VIIIa and Ib and VIb of the Periodic Table of the Elements. Among these elements, preference is given to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi. Greater preference is given to Zn, Cu, Ni, Pd, Pt, Ru, Rh, Fe, Mn, Ag and Co. For the purposes of the present invention, Cu, Fe, Co, Zn, Mn and Ag are more preferred. Very particular preference is given to Cu, Fe and Zn. As metal ions which can be provided in the reaction medium by means of anodic oxidation, mention may be made of, in particular, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3}\backslash Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $IST$, $Pd^{2+}$, $Pd^{+}$, $Pt^{2+}$, $Pf$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$. Particular preference is given to $Cu^{2+}$, $Cu^{+}$, $Fe^{2+}$, $Fe^{3+}$, $Zn^{2+}$, $Co^{3+}$, $Co^{2+}$, $Ag^{+}$, $Mg^{2+}$ and $Mn^{2+}$. Very particular preference is given to $Cu^{2+}$, $Cu^{+}$, $Fe^{2+}$; $Fe^{3+}$ and $Zn^{2+}$.

It is thus possible to use a copper-comprising anode and/or an iron-comprising anode and/or a zinc-comprising anode and/or a silver-comprising anode and/or a manganese-comprising anode as metal ion source.

It is likewise possible to use a copper-comprising anode and/or an iron-comprising anode and/or a zinc-comprising anode and/or a manganese-comprising anode as metal ion source.

Preference is given to using a copper-comprising anode and/or an iron-comprising anode and/or a zinc-comprising anode as metal ion source.

The make-up of the anode used can in principle be chosen freely, as long as it is ensured that the at least one metal ion can be made available by anodic oxidation in the reaction medium for the formation of the porous metal-organic framework.

Preference is given to, inter alia, anodes in the form of a rod and/or a ring and/or a disk, for example, an annular disk, and/or a plate and/or a tube and/or a bed and/or a cylinder and/or a cone and/or a frustum of a cone.

In a preferred embodiment, the MOF is prepared electrochemically using at least one sacrificial anode. The term "sacrificial anode" refers to an anode which dissolves at least partly during the course of the process. Embodiments in which at least part of the dissolved anodic material is replaced during the course of the process are also comprised here. This can, for example, be brought about by at least one new anode being introduced into the reaction system or, in a preferred embodiment, an anode being introduced into the reaction system and being introduced further into the reaction system either continuously or discontinuously during the course of the process according to the invention.

Preference is given to using anodes which consist of the at least one metal serving as metal ion source or comprise this at least one metal applied to at least one suitable support material.

The geometry of the at least one support material is subject to essentially no restrictions. For example, it is possible to use support materials in the form of a woven fabric and/or a thin sheet and/or a felt and/or a mesh and/or rod and/or a candle and/or a cone and/or a frustum of a cone and/or a ring and/or a disk and/or a plate and/or a tube and/or a bed and/or a cylinder.

Possible support materials which can be used are, for example, metals such as at least one of the abovementioned metals, alloys such as steels or bronzes or brass, graphite, felt or foams.

Very particular preference is given to anodes which consist of the at least one metal serving as metal ion source.

The make-up of the cathode used can in principle be chosen freely, as long as it is ensured that the at least one metal ion can be made available by anodic oxidation in the reaction medium for formation of the porous metal-organic framework.

In a preferred embodiment, the electrically conductive electrode material of the at least one cathode is selected so that no interfering secondary reaction takes place in the reaction medium. Preferred cathode materials are, inter alia, graphite, copper, zinc, tin, manganese, silver, gold, platinum or alloys such as steels, bronzes or brass.

As preferred combinations of the anode material serving as metal ion source and the electrically conductive cathode material, mention may be made, for example, of the following:

| Anode | Cathode |
|---|---|
| Zinc | Zinc |
| Copper | Copper |
| Magnesium | Copper |
| Cobalt | Cobalt |
| Iron | Steel |
| Copper | Steel |

The geometry of the at least one cathode is subject to essentially no restrictions. It is possible, for example, to use cathodes in the form of a rod and/or a ring and/or a disk and/or a plate and/or a tube.

It is basically possible to use any of the types of cells customary in electrochemistry. In the process according to the invention, very particular preference is given to an electrolysis cell which is suitable for use of sacrificial electrodes.

In principle, it is possible inter alia, to use divided cells having, for example, a parallel arrangement of flat electrodes or candle-shaped electrodes. As partition medium between the cell compartments, it is possible to use, for example, ion-exchange membranes, microporous membranes, diaphragms, filter cloths comprising materials which do not conduct electrons, glass frits and/or porous ceramics. Preference is given to using ion-exchange membranes, in particular cation-exchange membranes, among which preference is in turn given to membranes which comprise a copolymer of tetrafluoroethylene and a perfluorinated monomer comprising sulfonic acid groups.

In a preferred embodiment, one or more undivided cells are used.

Accordingly, the present invention also provides a method as described above, wherein the process is carried out in an undivided electrolysis cell.

Very particular preference is given to combinations of geometries of anode and cathode in which the sides of the anode and cathode which face one another together form a gap of homogeneous thickness.

In the at least one undivided cell, the electrodes are, for example, preferably arranged parallel to one another with the electrode gap having a homogeneous thickness in the range from, for example, 0.5 mm to 30 mm, preferably in the range from 0.75 mm to 20 mm and particularly preferably in the range form 1 to 10 mm.

In a preferred embodiment, it is possible, for example, for a cathode and an anode to be arranged parallel to one another so that an electrode gap having a homogeneous thickness in the range from 0.5 to 30 mm, preferably in the range from 1 to 20 mm, more preferably in the range from 5 to 15 mm and particularly preferably in the range from 8 to 12 mm, for example in the region of about 10 mm, is formed in the resulting cell. For the purposes of the present invention, this type of cell will be referred to as a "gap cell".

In a preferred embodiment, the above-described cell is used as a bipolar cell.

Apart from the above-described cell, the electrodes are employed individually or as a stack of a plurality thereof in a likewise preferred embodiment of the method of the invention. In the latter case, the electrodes are stack electrodes which are preferably connected in series in a bipolar fashion in what is accordingly referred to as a plate stack cell. Particularly when the process of the invention is carried out on an industrial scale, preference is given to using at least one pot cell and particularly preferably plate stack cells connected in series whose in-principle construction is described in DE 195 33 773 A1, whose relevant contents are fully incorporated by reference into the present patent application.

In the preferred embodiment of the plate stack cell, preference is given, for example, to sheets of suitable materials, for example copper sheets, being arranged parallel to one another so that a gap having a homogeneous thickness in the range from 0.5 to 30 mm, preferably in the range from 0.6 to 20 mm, more preferably in the range from 0.7 to 10 mm, more preferably in the range from 0.8 to 5 mm and in particular in the range from 0.9 to 2 mm, for example in the region of about 1 mm, is formed between each of the individual sheets. The distances between the individual sheets can be identical or different, and in a particularly preferred embodiment the distances between the sheets are essentially identical. In a further embodiment, the material of a sheet of the plate stack cell can differ from the material of another sheet of the plate stack cell. For example, one sheet can be made of graphite and another sheet can be made of copper, with the copper sheet preferably being connected as anode and the graphite sheet preferably being connected as cathode.

Preference is also given to using "pencil sharpener" cells as are described, for example, in J. Chaussard et al., J. Appl. Electrochem. 19 (1989) 345-348, whose relevant contents are fully incorporated by reference into the present patent application. Particular preference is given to using pencil sharpener electrodes having rod-shaped electrodes which can be fed in further in the process according to the invention.

Accordingly, the present invention also provides, in particular, a method as described above, wherein the process is carried out in a gap cell or plate stack cell.

Cells in which the electrode spacing is less than or equal to 1 mm are referred to as capillary gap cells.

In a likewise preferred embodiment, electrolysis cells having, for example, porous electrodes made up of metal beds or having, for example, porous electrodes made of metal meshes or having, for example, both electrodes made up of metal beds and electrodes made of metal meshes can be used.

In a further preferred embodiment, the process according to the invention is carried out using electrolysis cells which have at least one sacrificial anode having a round disk-shaped cross section and at least one cathode having an annular cross section, with the diameter of the preferably cylindrical anode particularly preferably being smaller than the internal diameter of the cathode and the anode being installed in the cathode in such a way that a gap having a homogeneous thickness is formed between the external cylindrical surface of the anode and the interior surface of the cathode which at least partly surrounds the anode.

It is also possible to reverse the polarity so as to make the original anode the cathode and the original cathode the anode. In this process variant, it is possible, for example, to choose electrodes comprising different metals so that one metal is firstly anodically oxidized to make it available as metal cation for formation of the metal-organic framework and, in a second step after reversal of the polarity, a further metal is made available for formation of the metal-organic framework. It is likewise possible to bring about reversal of polarity by application of alternating current.

It is in principle possible to carry out the process batchwise or continuously or in a mixed mode. The process is preferably carried out continuously in at least one flow cell.

The voltages employed can be matched to the respective at least one metal of the at least one anode serving as metal ion source for the porous metal-organic framework and/or to the properties of the at least one bidentate organic compound and/or, if appropriate, to the properties of the at least one solvent described below and/or, if appropriate, to the properties of the at least one electrolyte salt described below and/or to the properties of the at least cathodic depolarization compound described below.

In general, the voltages per electrode pair are in the range from 0.5 to 100 V, preferably in the range from 2 to 40 V and particularly preferably in the range form 4 to 20 V. Examples of preferred ranges are from about 4 to 10 V and from 10 to 20 V and from 20 to 25 V and from 10 to 25 V and from 4 to 20 V and from 4 to 25 V. The voltage can be constant during the course of the process of the invention or can change continuously or discontinuously during the course of the process.

For example, when copper is anodically oxidized, the voltages are generally in the range from 3 to 20 V, preferably in the range from 3.5 to 15 V and particularly preferably in the range from 4 to 15 V.

The current densities occurring in the preparation of the porous organic frameworks are generally in the range from 0.01 to 1000 mA/cm$^2$, preferably in the range from 0.1 to 1000 mA/cm$^2$, more preferably in the range from 0.2 to 200 mA/cm$^2$, more preferably in the range from 0.3 to 100 mA/cm$^2$ and particularly preferably in the range from 0.5 to 50 mA/cm$^2$.

The amounts of charge (Ah) used in the process are preferably in the range from 30 to 200% of the amount of charge which is necessary to bind the amount of the preferably used acid equivalents of the at least one at least bidentate compound.

The process is generally carried out at a temperature in the range from 0° C. to the boiling point of the respective reaction medium or the at least one solvent used, preferably in the range from 20° C. to the boiling point, preferably under atmospheric pressure. It is likewise possible to carry out the process under superatmospheric pressure, with pressure and temperature preferably being chosen so that the reaction medium is preferably at least partly liquid.

In general, the process is carried out at a pressure in the range from 0.5 to 50 bar, preferably in the range from 1 to 6 bar and particularly preferably at atmospheric pressure.

Depending on the type and state of matter of the constituents of the reaction medium, the electrochemical preparation of the porous metal-organic framework can in principle also be carried out without additional solvent. This is particularly the case when, for example, at least one of the at least bidentate compounds functions as solvent or as solvent mixture in the reaction medium.

It is likewise in principle possible to carry out the process without use of a solvent, for example in the melt, in which case at least one constituent of the reaction medium is present in the molten state.

In a preferred embodiment, the reaction medium comprises at least one suitable solvent in addition to the at least one at least bidentate organic compound and, if appropriate, to the at least one electrolyte salt and, if appropriate, to the at least one cathodic depolarization compound. Here, the chemical nature and the amount of this at least one solvent can be matched to the at least one at least bidentate organic compound and/or to the at least one electrolyte salt and/or to the at least one cathodic depolarization compound and/or to the at least one metal ion.

Accordingly, the present invention also provides a method as described above, wherein the reaction medium further comprises at least one solvent in addition to the at least one at least bidentate organic compound.

Conceivable solvents are in principle all solvents or all solvent mixtures in which the starting materials used in the process can be at least partly dissolved or suspended under the reaction conditions, e.g. pressure and temperature, selected. Examples of preferred solvents are, inter alia, water;
alcohols having 1, 2, 3 or 4 carbon atoms, e.g. methanol, ethanol, n-propanol, isopropanol, n-butanol, isobutanol, tert-butanol;
carboxylic acids having 1, 2, 3 or 4 carbon atoms, e.g. formic acid, acetic acid, propionic acid or butanoic acid;
nitriles such as acetonitrile or cyanobenzene;
ketones such as acetone;
at least singly halogen-substituted lower alkanes such as methylene chloride or 1,2-dichloroethane;
acid amides such as amides of lower carboxylic acids, e.g. carboxylic acids having 1, 2, 3 or 4 carbon atoms, for example amides of formic acid, acetic acid, propionic acid or butanoic acid, e.g. formamide, dimethylformamide (DMF), diethylformamide (DEF), t-butylformamide, acetamide, dimethylacetamide, diethylacetamide or t-butylacetamide;
cyclic ethers such as tetrahydrofuran or dioxane; N-formylamides or N-acetylamides or symmetrical or unsymmetrical urea derivatives of primary, secondary or cyclic amines such as ethylamine, diethylamine, piperidine or morpholine;
amines such as ethanolamine, triethylamine or ethylenediamine;
dimethyl sulfoxide;
pyridine;
trialkyl phosphites and phosphates;

or mixtures of two or more of the abovementioned compounds.

The term "solvent" as used above includes both pure solvents and solvents which comprise small amounts of at least one further compound such as, preferably, water. In this case, the water contents of the abovementioned solvents are in the range from up to 1% by weight, preferably in the range from up to 0.5% by weight, particularly preferably in the range from 0.01 to 0.5% by weight and in particular in the range from 0.1 to 0.5% by weight. The term "methanol" or "ethanol" or "acetonitrile" or "DMF" or "DEF" includes, for example, a solvent which can in each case comprise, particularly preferably, water in the range from 0.1 to 0.5% by weight.

Preferred solvents for use are methanol, ethanol, acetonitrile, DMF and DEF and mixtures of two or more of these compounds. Very particular preference is given to methanol, ethanol, DMF, DEF and mixtures of two or more of these compounds as solvent.

In a preferred embodiment, at least one protic solvent is used as solvent. This is, inter alia, used particularly when cathodic formation of hydrogen is to be achieved to avoid the redeposition as described below of the at least one metal ion provided by anodic oxidation on the cathode.

When methanol is used as solvent, for example, the temperature under atmospheric pressure is generally in the range from 0 to 90° C.; preferably in the range from 0 to 65° C. and particularly preferably in the range from 25 to 65° C.

When ethanol is used as solvent, for example, the temperature under atmospheric pressure is generally in the range from 0 to 100° C.; preferably in the range from 0 to 78° C. and particularly preferably in the range from 25 to 78° C.

The pH of the reaction medium is set so that it is advantageous for the synthesis or the stability or preferably for the synthesis and the stability of the framework. For example, the pH can be adjusted by means of the at least one electrolyte salt.

If the reaction is carried out as a batch reaction, the reaction time is generally in the range up to 30 hours, preferably in the range up to 20 hours, more preferably in the range from 1 to 10 hours and particularly preferably in the range from 1 to 5 hours.

The term "at least bidentate organic compound" refers to an organic compound comprising at least one functional group which is able to form at least two, preferably two, coordinate bonds to a given metal ion and/or to form a coordinate bond to each of two or more, preferably two, metal atoms.

Examples of functional groups via which the coordinate bonds mentioned can be formed are, in particular, the following functional groups: $-CO_2H$, $-CS_2H$, $-NO_2$, $-B(OH)_2$, $-SO_3H$, $-Si(OH)_3$, $-Ge(OH)_3$, $-Sn(OH)_3$, $-Si(SH)_4$, $-Ge(SH)_4$, $-Sn(SH)_3$, $-PO_3H$, $-AsO_3H$, $-AsO_4H$, $-P(SH)_3$, $-As(SH)_3$, $-CH(RSH)_2$, $-C(RSH)_{3>}$, $-CH(RNH_2)_{2>}$, $-C(RNH_2)_3$, $-CH(ROH)_2$, $-C(ROH)_3$, $-CH(RCN)_2$, $-C(RCN)_{3>}$, where R is, for example, preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group having 1 or 2 aromatic rings, for example 2 $C_6$ rings, which may optionally be fused and may, independently of one another, be appropriately substituted by at least one substituent each and/or may, independently of one another, each comprise at least one heteroatom such as N, O and/or S. In likewise preferred embodiments, mention may be made of functional groups in which the abovementioned radical R is not present. In this respect, mention may be made of, inter alia, $-CH(SH)_2$, $-C(SH)_3$, $-CH(NH_2)_2$, $-C(NH_2)_3$, $-CH(OH)_2$, $-C(OH)_3$, $-CH(CN)_2$ or $-C(CN)_3$.

The at least two functional groups can in principle be bound to any suitable organic compound, as long as it is ensured that the organic compound bearing these functional groups is capable of forming the coordinate bond and producing the framework.

The organic compounds comprising the at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. More preferably, the aliphatic compound or the aliphatic part of the both aliphatic and aromatic compound comprises from 1 to 15, more preferably from 1 to 14, more preferably from 1 to 13, more preferably from 1 to 12, more preferably from 1 to 11 and particularly preferably from 1 to 10, carbon atoms, for example, 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, in which case the rings may be present separately from one another and/or at least two rings may be present in fused form. The aromatic compound or the aromatic part of the both aliphatic and aromatic compound more preferably has one, two or three rings, with one or two rings being particularly preferred. Furthermore, each ring of the compound mentioned can independently comprise at least one heteroatom such as N, O, S, B, P, Si, Al, preferably N, O and/or S. More preferably, the aromatic compound or the aromatic part of the both aromatic and aliphatic compound comprises one or two $C_6$ rings, with the two being present separately from one another or in fused form. In particular, mention may be made of benzene, naphthalene and/or biphenyl and/or bipyridyl and/or pyridine as aromatic compounds.

Examples which may be mentioned are, inter alia, trans-muconic acid and fumaric acid and phenylenebisacrylic acid.

For the purposes of the present invention, mention may be made, for example of dicarboxylic acids such as 1,4-butanedicarboxylic acid, tartaric acid, glutaric acid, oxalicacid 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, 1,3-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octanedicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis-(phenylamino)-benzene-2,5-dicarboxylic acid, 1,1'-binaphthyl-8,8'-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis-(carboxymethyl)-piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxo-imidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, O-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diamino(diphenyl ether)-diimidedicarboxylic acid, 4,4'-diaminodiphenylmethanediimidedicarboxylic acid, 4,4'-diamino(diphenyl sulfone) diimidedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedicarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-dicarboxylic acid, 4(1H)-oxo-thiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptanedicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid 1,14-tetradecanedicarboxylic acid, 5,6-dehydronorbornane-2,3-dicarboxylic acid or 5-ethyl-2,3-pyridinedicarboxylic acid, Tricarboxylic acids such as 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid, or tetracarboxylic acids such as 1,1-dioxidoperylo[1,12-BCD]thiophene-3,4,9,10-tetracarboxylic acid, perylenetetra-carboxylic acids such as perylene-3,4,9,10-tetracarboxylic acid or perylene-1,12-sulfone-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetra-carboxylic acid, 1,2,4,5-benzenetetracarboxylic acid, 1,2,11,12-dodecanetetra-carboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Very particular preference is given to using optionally at least monosubstituted aromatic dicarboxylic, tricarboxylic or tetracarboxylic acids having one, two, three, four or more rings, with each of the rings being able to comprise at least one heteroatom and two or more rings being able to comprise identical or different heteroatoms. Examples of preferred carboxylic acids of this type are one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, Si, Al, and preferred heteroatoms here are N, S and/or O. Suitable substituents here are, inter alia, —OH, a nitro group, an amino group or an alkyl or alkoxy group.

As at least bidentate organic compounds, particular preference is given to using acetylenedicarboxylic acid (ADC), benzenedicarboxylic acids, naphthalenedicarboxylic acids, biphenyldicarboxylic acids such as 4,4'-biphenyldicarboxylic acid (BPDC), bipyridinedicarboxylic acids such as 2,2'-bipyridinedicarboxylic acids, e.g. 2,2'-bipyridine-5,5'-dicarboxylic acid, benzenetricarboxylic acids such as 1,2,3-benzenetricarboxylic acid or 1,3,5-benzenetricarboxylic acid (BTC), adamantane-tetracarboxylic acid (ATC), adamantanedibenzoate (ADB) benzenetribenzoate (BTB), methanetetrabenzoate (MTB), adamantanetetrabenzoate or dihydroxyterephthalic acids such as 2,5-dihydroxyterephthalic acid (DHBDC).

Very particular preference is given to using, inter alia, terephthalic acid, 2,5-dihydroxy-terephthalic acid, 1,2,3-benzenetricarboxylic acid, 1,3,5-benzenetricarboxylic acid or 2,2'-bipyridine-5,5'-dicarboxylic acid.

In a preferred embodiment, 1,3,5-benzenetricarboxylic acid is used as at least bidentate organic compound. If at least one solvent is used, preference is given to using, for example, methanol or ethanol or methanol and ethanol as solvent. Particular preference is given to ethanol.

In a further, preferred embodiment, 1,2,3-benzenetricarboxylic acid is used as at least bidentate organic compound. If at least one solvent is used, preference is given to using, for example, methanol or ethanol or methanol and ethanol as solvent. Particular preference is given to methanol.

In a further, for example preferred embodiment, terephthalic acid is used as at least bidentate organic compound. If at least one solvent is used, preference is given to using, for example, dimethylformamide or diethylformamide or dimethylformamide and diethylformamide as solvent. Particular preference is given to diethylformamide.

In a further, for example preferred embodiment, dihydroxyterephthalic acid is used as at least bidentate organic compound. If at least one solvent is used, preference is given to using, for example, dimethylformamide or diethylformamide or dimethylformamide and diethylformamide as solvent. Particular preference is given to diethylformamide.

In a further for example preferred, embodiment, naphthalene-2,6-dicarboxylic acid is used as at least bidentate organic compound. If at least one solvent is used, preference is given to using, for example, methanol or ethanol or methanol and ethanol as solvent. Particular preference is given to methanol.

The at least one at least bidentate compound is used in a concentration which is generally in the range from 0.1 to 30% by weight, preferably in the range from 0.5 to 20% by weight and particularly preferably in the range from 2 to 10% by weight, in each case based on the total weight of the reaction system minus the weight of the anode and the cathode. Accordingly, the term "concentration" in this case comprises both the amount of the at least bidentate compound dissolved in the reaction system and, for example, the amount of the at least one at least bidentate compound which may, if appropriate, be suspended in the reaction system.

In a preferred embodiment, the at least one at least bidentate compound is added continuously and/or discontinuously as a function of the progress of the electrolysis and in particular as a function of the decomposition of the anode or liberation of the at least one metal ion and/or as a function of the formation of the metal-organic framework.

The following combinations of metal from which the at least one metal cation is provided by means of anodic oxidation, at least bidentate compound and solvent are, for example, preferred:

Zn/BDC/DEF; Zn/DHBDC/DEF; Zn/H$_2$BDC/DMF; Zn/BDC/DMF, MeOH;
Zn/H$_2$BDC/DMF; Zn/4,4'-BP-2,2'-DC/DEF; Zn/2,6-NDC/DEF;
Zn/H$_3$BTB/H$_2$O, DMF,EtOH; Zn/H$_2$BDC/DMSO; Zn/1,4-NDC/DMF;
Zn/H$_3$BTB/DMF,EtOH; Zn/H$_2$BDC/DMF,AN; Zn/H$_2$BDC/DMSO;
Zn/H$_2$BDC/DMSO, MeOH; Zn/H$_2$BDC/DMSO,n-propanol; Zn/H$_2$BDC/NMP;
Zn/m-BDC/DMF,AN; Zn/1,4-NDC/DMF,EtOH; Zn/H$_2$N—BDC/DEF,EtOH;
Zn/1,4-NDC/DEF; Zn/2,6-NDC/DEF; Zn/PDC/DEF;
Cu/BDC/DEF; Cu/1,3,5-BTC/EtOH; Cu/1,2,3-BTC/MeOH; Cu/H$_3$BTB/H$_2$O, DMF,EtOH;
Cu/H$_2$BDC(OH)$_2$/DMF; Cu/thiophenedicarboxylic acid/DEF; Cu/thiophenedicarboxylic acid/DMF; Cu/thiophenedicarboxylic acid/MeOH; Cu/malonic acid/DMF; Cu/glutaric acid/DMF; Cu/tartaric acid/DMF;
Fe/H$_2$BDC/DMF; Fe/H$_3$BDC/DMF; Fe/BTC/DMF; Fe/BDC/DMF, EtOH; Fe/BPDC/DMF, n-propanol; Fe/m-BDC/pyridine; Fe/m-BDC/DMF, pyridine;
Co/BDC/MeOH; Co/H$_2$BDC/NMP; Co/H$_2$BDC/DMF
Mg/BDC/DEF; Mg/BDC(OH)$_2$/DMF;
Pb/H$_2$BDC/DMF, EtOH.

Here, the following abbreviations apply:
BDC benzenedicarboxylic acid
m-BDC m-benzenedicarboxylic acid
H$_2$BDC dihydroterephthalic acid
H$_2$N—BDC aminoterephthalic acid
4,4'-BP-2,2'-DC 4,4'-biphenyl-2,2'-dicarboxylic acid
4,4'-BPDC 4,4'-biphenyldicarboxylic acid
H$_3$BTB benzenetribenzoate
1,3,5-BTC 1,3,5-benzenetricarboxylic acid
1,2,3-BTC 1,2,3-benzenetricarboxylic acid
DHBDC 2,5-dihydroxyterephthalic acid
2,6-NDC 2,6-naphthalenedicarboxylic acid
1,4-NDC 1,4-naphthalenedicarboxylic acid
PDC pyrenedicarboxylic acid In a particularly preferred embodiment, the reaction medium comprises at least one suitable electrolyte salt. Depending on the at least one compound used and/or the solvent which may be used if appropriate, it is also possible, in the process according to the invention, to carry out the preparation at least bidentate without an additional electrolyte salt.

The electrolyte salts which can be used in the process according to the invention for of the metal-organic framework are subject to essentially no restrictions. Preference is given to using, for example, salts of mineral acids, sulfonic acids, phosphonic acids, boronic acids, alkoxysulfonic acids or carboxylic acids or other acidic compounds such as sulfonamides or imides.

Possible anionic components of the at least one electrolyte salt are accordingly, inter alia, sulfate, nitrate, nitrite, sulfite, disulfite, phosphate, hydrogenphosphate, dihydrogenphosphate, diphosphate, triphosphate, phosphite, chloride, chlorate, bromide, bromate, iodide, iodate, carbonates or hydrogencarbonate.

Possible cation components of the electrolyte salts which can be used according to the invention are, inter alia, alkali metal ions such as $Li^+$, $Na^+$, $K^+$ or $Rb^+$, alkaline earth metal ions such as $Mg^{2+}$, $Ca^{2+}$, $Sr^{2+}$ or $Ba^{2+}$, ammonium ions or phosphonium ions.

Among the ammonium ions, quaternary ammonium ions and protonated monoamines, diamines and triamines may be mentioned.

Examples of quaternary ammonium ions which are preferably used are, inter alia,
  symmetrical ammonium ions such as tetraalkylammonium preferably bearing $C_1$-$C_4$-alkyl, for example methyl, ethyl, n-propyl, isopropyl, n-butyl, isobutyl, tert-butyl, e.g. tetramethylammonium, tetraethylammonium, tetrapropylammonium, tetrabutylammonium, or
  unsymmetrical ammonium ions such as unsymmetrical tetraalkylammonium preferably bearing $C_1$-$C_4$-alkyl, for example methyl, ethyl, n-propyl, isopropyl, n-butyl, isobutyl, tert-butyl, e.g. methyltributylammonium, or
  ammonium ions bearing at least one aryl, for example phenyl or naphthyl, or at least one alkaryl, for example benzyl, or at least one aralkyl and at least one alkyl, preferably $C_1$-$C_4$-alkyl, for example methyl, ethyl, n-propyl, isopropyl, n-butyl, isobutyl, tert-butyl, e.g. aryltrialkyl, e.g. benzyltrimethylammonium or benzyltriethylammonium.

In a particularly preferred embodiment, at least one electrolyte salt which comprises a methyltributylammonium ion as at least one cationic component is used.

In a particularly preferred embodiment, methyltributylammonium methylsulfate is used as electrolyte salt.

Ionic liquids such as methylethylimidazolium chloride or methylbutylimidazolium chloride can also be used as electrolyte salts in the process according to the invention.

In a likewise preferred embodiment, methanesulfonate is used as electrolyte salt.

As cation component of the at least one electrolyte salt, mention may also be made according to the invention of protonated or quaternary heterocycles such as the imidazolium ion.

In a preferred embodiment, compounds which are used for the formation of the metal-organic framework can be introduced into the reaction medium via the cationic and/or anionic component of the at least one electrolyte salt. These compounds are compounds which influence the formation of the structure of the metal-organic framework but are not comprised in the resulting framework and also compounds which are comprised in the resulting framework. In particular, at least one compound which is comprised in the resulting metal-organic framework can be introduced via at least one electrolyte salt in the process of the invention.

Preference is given, for example, in this respect to, inter alia, tetraalkylammonium carboxylate such as a monotetraalkylammonium salt of 1,3,5-benzenetricarboxylic acid. In this embodiment, preference is given, inter alia, to using 1,3,5-benzene-tricarboxylic acid together with tetraalkylammonium hydroxide in methanol as solvent. This method of carrying out the process offers, inter alia, the advantage that tetraalkylammonium hydroxide is generally used as an aqueous solution and water thus automatically becomes an essential constituent of the reaction medium.

In an embodiment, it is thus possible for the metal ion to be introduced into the reaction medium via the cationic component of the at least one electrolyte salt in addition to the at least one anode as metal ion source. It is likewise possible for at least one metal ion which is different from the at least one metal ion introduced by means of anodic oxidation to be introduced into the reaction medium via the cationic component of the at least one electrolyte salt. In this case, the difference can be in the valence of the cation and/or the type of metal.

It is likewise possible to use salts whose anion component or anion components is/are a compound/compounds used for the formation of the metal-organic framework as electrolyte salts in the process of the invention. In particular, use can therefore be made of electrolyte salts whose anion component is, for example, the monocarboxylate or dicarboxylate or tricarboxylate or tetracarboxylate or monosulfonate or disulfonate or trisulfonate or tetrasulfonate, preferably a dicarboxylate or tricarboxylate or tetracarboxylate and more preferably the dicarboxylate or tricarboxylate or tetracarboxylate, of the aromatic dicarboxylic, tricarboxylic or tetracarboxylic acids which are preferably used.

The present invention further provides the method as described above, wherein the at least one electrolyte salt comprises a quaternary ammonium ion as cation component and a carboxylate of the at least one at least bidentate compound as anion component.

In the process according to the invention, the concentration of the at least one electrolyte salt is generally in the range from 0.01 to 10% by weight, preferably in the range from 0.05 to 5% by weight and particularly preferably in the range from 0.1 to 3% by weight, in each case based on the sum of the weights of all electrolyte salts present in the reaction system and also based on the total weight of the reaction system without taking account of the anodes and cathodes.

An important advantage of the process described is that none of the abovementioned critical anions such as halides or nitrate, which in the conventional process are introduced into the reaction medium via the at least one metal salt, is used in stoichiometric amounts but instead the at least one electrolyte salt is introduced in substoichiometric amounts, i.e. in essentially catalytic amounts, if at all.

If the process is carried out in the batch mode, the reaction medium comprising the starting materials is generally firstly provided, current is subsequently applied and the reaction mixture is then circulated by pumping.

If the process is carried out continuously, a substream is generally discharged from the reaction medium, the crystalline porous metal-organic framework comprised therein is isolated and the mother liquor is returned.

A further advantage of the abovementioned method over the methods known from the prior art which start out from metal salts in the preparation of the porous metal-organic frameworks is the fact that according to the invention it is possible to achieve a higher solids content in the reaction medium per synthesis batch, since the solids content is not limited by the amount of starting salt used. This is because the metal cation can be introduced in any further amounts via the anode.

The term "solids content" as used for the purposes of the present invention refers to the amount of solids separated off after the reaction, based on the total amount of the reaction mixture.

In contrast to preparative methods of the prior art, in which not only the ligand but also the metal salt is to be dissolved, the at least one solvent is available in its totality for dissolving and/or suspending, preferably for dissolving the ligand, in the context of the abovementioned method.

This applies particularly in a continuous variant of the abovementioned process in which the anode is fed in further to the extent to which it is consumed by anodic oxidation. This is, as described above, carried out, for example, in a pencil sharpener cell. In a manner analogous to the further introduction of the anode, further amounts of the at least one at least bidentate compound are introduced. The resulting suspension comprising the metal-organic framework can then be discharged continuously.

The economics of the process for preparing the porous metal-organic frameworks are improved considerably by this further introduction of the metal cation via the further introduction of the anode which can be carried out experimentally in a simple manner.

In general, the solids content is at least 0.5% by weight, particularly preferably in the range from 0.5 to 50% by weight.

In a particularly preferred embodiment, the abovementioned process is carried out in such a way that redeposition of the metal ion which has been liberated by anodic oxidation on the cathode is prevented.

This redeposition is preferably prevented by, for example, using a cathode which has an appropriate hydrogen overvoltage in a given reaction medium. Such cathodes are, for example, the abovementioned graphite, copper, zinc, tin, manganese, silver, gold, platinum cathodes or cathodes comprising alloys such as steels, bronzes or brass.

The redeposition is preferably also prevented by, for example, an electrolyte which favors the cathodic formation of hydrogen being used in the reaction medium. In this case, preference is given, inter alia, to an electrolyte which comprises at least one protic solvent. Preferred examples of such solvents have been given above. Particular preference is given to alcohols, in particular methanol and ethanol.

The redeposition is preferably also prevented by, for example, at least one compound which leads to cathodic depolarization being comprised in the reaction medium. For the purposes of the present invention, a compound which leads to cathodic depolarization is any compound which is reduced at the cathode under the given reaction conditions.

Preferred cathodic depolarizers are, inter alia, compounds which are hydrodimerized at the cathode. Examples of compounds which are particularly preferred in this context are acrylonitrile, acrylic esters and maleic esters such as, more preferably, dimethyl maleate.

As cathodic depolarizers, preference is also given, inter alia, to compounds which comprise at least one carbonyl group which is reduced at the cathode. Examples of such compounds comprising carbonyl groups are esters such as dialkyl phthalates and ketones such as acetone.

As cathodic depolarizers, preference is given, inter alia, to compounds which have at least one nitrogen-oxygen bond, a nitrogen-nitrogen bond and/or a nitrogen-carbon bond which is/are reduced at the cathode. Examples of such compounds are compounds having a nitro group, compounds having an azo group, compounds having an azoxy group, oximes, pyridines, imines, nitrites and/or cyanates.

In the process described, it is also possible to combine at least two of the abovementioned measures for preventing cathodic redeposition. For example, it is possible both to use an electrolyte which favors the cathodic formation of hydrogen and also to use an electrode having an appropriate hydrogen overvoltage. It is likewise possible both to use an electrolyte which favors the cathodic formation of hydrogen and to add at least one compound which leads to cathodic depolarization. It is likewise possible both to add at least one compound which leads to cathodic depolarization and to use a cathode having an appropriate hydrogen overvoltage. It is also possible both to use an electrolyte which favors the cathodic formation of hydrogen and to use an electrode having an appropriate hydrogen overvoltage and also to add at least one compound which leads to cathodic depolarization.

Accordingly, the present invention also provides a process as described above in which cathodic redeposition of the at least one metal ion is at least partly prevented by means of at least one of the following measures:

(i) use of an electrolyte which favors cathodic formation of hydrogen;
(ii) addition of at least one compound which leads to cathodic depolarization;
(iii) use of a cathode having an appropriate hydrogen overvoltage.

The present invention therefore likewise provides a method as described above, in which the electrolyte according to (i) comprises at least one protic solvent, in particular an alcohol, more preferably methanol and/or ethanol.

The present invention therefore likewise provides a method as described above, in which the cathodic depolarization is a hydrodimerization, in particular a hydro-dimerization of a maleic diester, more preferably of dimethyl maleate.

The present invention particularly preferably comprises a method as described above, in which both at least one protic solvent, preferably an alcohol, more preferably methanol or ethanol or a mixture of methanol and ethanol, and at least one compound capable of cathodic hydrodimerization, preferably a maleic diester and more preferably dimethyl maleate, are used to prevent redeposition.

In a particularly preferred embodiment, the process of the invention is operated in the circulation mode. For the purposes of the present invention, this "electrolysis circuit" refers to any process configuration in which at least part of the reaction system present in the electrolysis cell is discharged from the electrolysis cell, if appropriate subjected to at least one intermediate treatment step such as at least one thermal treatment or addition and/or removal of at least one component from the discharged stream and returned to the electrolysis cell. For the purposes of the present invention, such an electrolysis circuit is particularly preferably operated in combination with a plate stack cell, a tube cell or a pencil sharpener cell.

After the preparation is complete, the generally crystalline framework is present in the form of primary crystals in the mother liquor.

After the preparation of the organic framework is complete, the framework solid is separated off from its mother liquor. This separation process can in principle be carried out by means of any suitable method. The framework solid is preferably separated off by solid-liquid separation, centrifugation, extraction, filtration, membrane filtration, crossflow filtration, diafiltration, ultrafiltration, flocculation using flocculants such as nonionic, cationic and/or anionic auxiliaries, pH shift by addition of additives such as salts, acids or bases, flotation, spray drying, spray granulation or evaporation of the mother liquor at elevated temperatures and/or under reduced pressure and concentration of the solid.

The separation can be followed by at least one additional washing step, at least one additional drying step and/or at least one additional calcination step.

If at least one washing step is employed, washing is preferably carried out using at least one solvent used in the synthesis.

If at least one drying step is employed, if appropriate after at least one washing step, then the framework solid is generally dried at temperatures in the range from 20 to 120° C., preferably in the range from 40 to 100° C. and particularly preferably in the range from 56 to 60° C.

Preference is likewise given to drying under reduced pressure, with the temperatures generally being able to be selected so that the at least one washing liquid is at least partly, preferably essentially completely, removed from the crystalline porous metal-organic framework and the framework structure is at the same time not destroyed.

The drying time is generally in the range from 0.1 to 15 hours, preferably in the range from 0.2 to 5 hours and particularly preferably in the range from 0.5 to 1 hour.

The if appropriate at least one washing step and if appropriate at least one drying step can be followed by at least one calcination step in which the temperatures are preferably selected so that the structure of the framework is not destroyed.

Washing and/or drying and/or calcination, in particular, make it possible, for example, to achieve at least partial, preferably essentially quantitative, removal of a template compound which may have been used, if appropriate, for the electrochemical preparation of the framework according to the invention.

Like the electrochemical method of preparation, the present invention also relates to the porous metal-organic framework itself which is prepared by the above-described process.

The crystalline porous metal-organic framework is generally obtained as a fine powder, with the crystals having a size in the range from 0.1 to 100 μm, determined by means of SEM (scanning electron microscopy).

The pore sizes of the electrochemically prepared porous metal-organic frameworks can be set within wide ranges via the type and number of the at least bidentate organic compound and/or the type and, if appropriate, oxidation state of the at least one metal ion.

It is accordingly possible for the framework to comprise micropores or mesopores or macropores or micropores and mesopores or micropores and macropores or meso-pores and macropores or micropores and mesopores and macropores. The frameworks prepared according to the invention particularly preferably comprise micropores or mesopores or micropores and mesopores. The term "micropores" as used for the purposes of the present invention refers to pores having a diameter of up to 2 nm. The term "mesopores" as used for the purposes of the present invention refers to pores having a diameter of from >2 nm up to 50 nm. These definitions correspond to the definitions given in Pure Appl. Chem. 45 (1976), p. 71 ff., in particular p. 79. The presence of micropores and/or mesopores can be determined by nitrogen adsorption measurements at 77 K in accordance with DIN 66131 and DIN 66135 and DIN 66134.

The specific surface area of the crystalline porous metal-organic frameworks prepared according to the invention, determined in accordance with DIN 66135, is generally at least 5 $m^2/g$, in particular greater than 5 $m^2/g$, more preferably at least 10 $m^2/g$, in particular greater than 10 $m^2/g$, more preferably at least 50 $m^2/g$, in particular greater than 50 $m^2/g$, more preferably at least 100 $m^2/g$, in particular greater than 100 $m^2/g$, more preferably at least 250 $m^2/g$, in particular greater than 250 $m^2/g$, more preferably at least 500 $m^2/g$, in particular greater than 500 $m^2/g$, with the specific surface area being able to be up to more than 1000 $m^2/g$, for example greater than 2000 $m^2/g$, as a further example greater than 3000 $m^2/g$ and as a particular example greater than 4000 $m^2/g$.

The term "specific surface area" refers in the present context to the surface area determined according to the Langmuir model at 77 K in accordance with DIN 66135.

In a further embodiment, the porous metal-organic framework which has been separated off from the mother liquor is shaped to produce one or more shaped bodies.

The possible geometries of these shaped bodies are subject to essentially no restrictions. Examples are, inter alia, pellets such as disk-shaped pellets, pills, spheres, granules, extrudates such as rod extrudates, honeycombs, grids and hollow bodies.

All suitable processes are in principle possible for producing these shaped bodies. The following procedures, inter alia, are preferred:

Kneading of the framework either alone or together with at least one binder and/or at least one pasting agent and/or at least one template compound to give a mixture; shaping of the resulting mixture by means of at least one suitable method, for example extrusion; optionally washing and/or drying and/or calcination of the extrudate; optionally finishing.

Application of the framework to at least one if appropriate porous support material. The material obtained can then be processed further by the method described above to give a shaped body.

Application of the framework to at least one if appropriate porous substrate.

Kneading and shaping can be carried out by any suitable method, as described, for example, in Ullmanns Enzyklopädie der Technischen Chemie, 4th edition, Volume 2, p. 313 ff. (1972), whose relevant contents are fully incorporated by reference into the present patent application.

For example, the kneading and/or shaping can preferably be carried out by means of a piston press, roll press in the presence or absence of at least one binder material, compounding, pelletization, tableting, extrusion, coextrusion, foaming, spinning, coating, granulation, preferably spray granulation, spraying, spray drying or a combination of two or more of these methods.

Pellets and/or tablets are very particularly preferably produced in the process of the invention.

The kneading and/or shaping can be carried out at elevated temperatures, for example in the range from room temperature to 300° C., and/or at elevated pressure, for example in the range from atmospheric pressure up to a few hundred bar, and/or in a protective gas atmosphere, for example in the presence of at least one noble gas, nitrogen or a mixture of two or more thereof.

The kneading and/or shaping is, according to a further embodiment, carried out with addition of at least one binder, with the binder used being able in principle to be any chemical compound which ensures the desired viscosity for kneading and/or shaping the composition to be kneaded and/or shaped. Accordingly, binders can, for the purposes of the present invention, be either viscosity-increasing or viscosity-reducing compounds.

Preferred binders include, for example, aluminum oxide or binders comprising aluminum oxide as described, for example, in WO 94/29408, silicon dioxide as described, for example, in EP 0 592 050 A1, mixtures of silicon dioxide and aluminum oxide as described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetra-ethoxysilane, tetrapropoxysilane, tetrabutoxysilane, and, for example, trialkoxysilanes such as trimethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tetrabutoxytitanate, and, for example, trialkoxytitanates such as trimethoxytitanate, triethoxytitanate, tripropoxytitanate, tributoxytitanate, alkoxyzirconates, for example tetraalkoxyzirconates such as tetramethoxyzirconate, tetraethoxyzirconate, tetrapropoxyzirconate, tetrabutoxy-zirconate, and, for example, trialkoxyzirconates such as trimethoxyzirconate, triethoxy-zirconate, tripropoxyzirconate, tributoxyzirconate, silica sols, amphiphilic substances and/or graphite. Particular preference is given to graphite.

As viscosity-increasing compound, it is also possible, for example, to use, if appropriate in addition to the abovementioned compounds, an organic compound and/or a hydrophilic polymer such as cellulose or a cellulose derivative such as methylcellulose and/or a polyacrylate and/or a polymethacrylate and/or a polyvinyl alcohol and/or a polyvinylpyrrolidone and/or a polyisobutene and/or a polytetrahydrofuran.

As pasting agent, preference is given to using, inter alia, water or at least one alcohol, for example a monoalcohol having from 1 to 4 carbon atoms, e.g. methanol, ethanol, n-propanol, isopropanol, 1-butanol, 2-butanol, 2-methyl-1-propanol or 2-methyl-2-propanol, or a mixture of water and at least one of the alcohols mentioned or a mono-hydric alcohol such as a glycol, preferably a water-miscible polyhydric alcohol, either alone or as a mixture with water and/or at least one of the monohydric alcohols mentioned.

Further additives which can be used for kneading and/or shaping are, inter alia, amines or amine derivatives such as tetraalkylammonium compounds or amino alcohols and carbonate-comprising compounds such as calcium carbonate. Such further additives are described, for instance, in EP 0 389 041 A1, EP 0 200 260 A1 or WO 95/19222.

The order of the additives such as template compound, binder, pasting agent, viscosity-increasing substance in shaping and kneading is in principle not critical.

In a further preferred embodiment, the shaped body obtained by kneading and/or shaping is subjected to at least one drying operation which is generally carried out at a temperature in the range from 25 to 300° C., preferably in the range from 50 to 300° C. and particularly preferably in the range from 100 to 300° C. It is likewise possible to carry out drying under reduced pressure or under a protective gas atmosphere or by spray drying.

In a particularly preferred embodiment, at least one of the compounds added as additives is at least partly removed from the shaped body during this drying operation.

In a further embodiment, the framework is applied to at least one if appropriate porous material. A porous substrate is preferably used here.

This application is particularly preferably effected by impregnation with a liquid, saturating in a liquid, spraying, deposition from a liquid phase, deposition from the gas phase (vapor deposition), precipitation, coprecipitation, coating.

As if appropriate porous substrate, preference is given to using aluminum oxide, silica gel, silicates, diatomaceous earths, kaolin, magnesium oxide, activated carbon, titanium dioxide, phosphates and/or zeolites.

If, for example, nonporous substrates are used, it is possible, in a further embodiment, to produce shell structures as are known from coated catalysts by application of the porous metal-organic framework to a nonporous shaped body.

Of course, it is also possible to add at least one suitable pore former in the production of the shaped bodies. Pore formers which can be used in the process according to the invention are all compounds which result in a particular pore size, a particular pore size distribution and/or particular pore volumes in the finished shaped body. Pore formers used in the process according to the invention are preferably, inter alia, polymeric vinyl compounds such as polystyrene, polyacrylates, polymethacrylates, polyolefins, poly-amides and polyesters. Very particularly preferred pore formers are, for instance, compounds which can be removed at least partly, preferably essentially completely, at the calcination temperatures of the process of the invention. An example is malonic acid For the purposes of the present invention, the electrochemically prepared porous metal-organic frameworks are used for absorbing and/or storing and/or releasing liquids and/or gases. The metal-organic frameworks can for this purpose be comprised in a shaped body.

The present invention accordingly also provides for the use of an electrochemically preparable porous metal-organic framework for purifying at least one liquid and/or at least one gas or as storage medium for at least one liquid and/or at least one gas.

The following examples illustrate the present invention.

EXAMPLES

Cu MOF which had been prepared electrochemically as described in the examples of DE 103 55 087 was used in all examples.

Example 1

Adsorption of Methane

Methane was adsorbed on 3 mm extrudates of the EMOF at 25° C. The measurement was carried out in a customary balance. The sample was dried at 120° C. and a pressure of <1 mbar for about 20 hours. The EMOF had a surface area of 616 m$^2$/g.

The following values were determined:

| Eqd/% | Pressure/bar |
|---|---|
| 0 | 0.00 |
| 0.161 | 0.29 |
| 0.448 | 1.04 |
| 1.352 | 3.47 |

-continued

| Eqd/% | Pressure/bar |
|---|---|
| 2.195 | 7.70 |
| 2.904 | 11.28 |
| 3.335 | 15.51 |
| 3.721 | 19.73 |
| −554.217 | 0.00 |

Eqd = Equilibrium distribution

Figure 1:
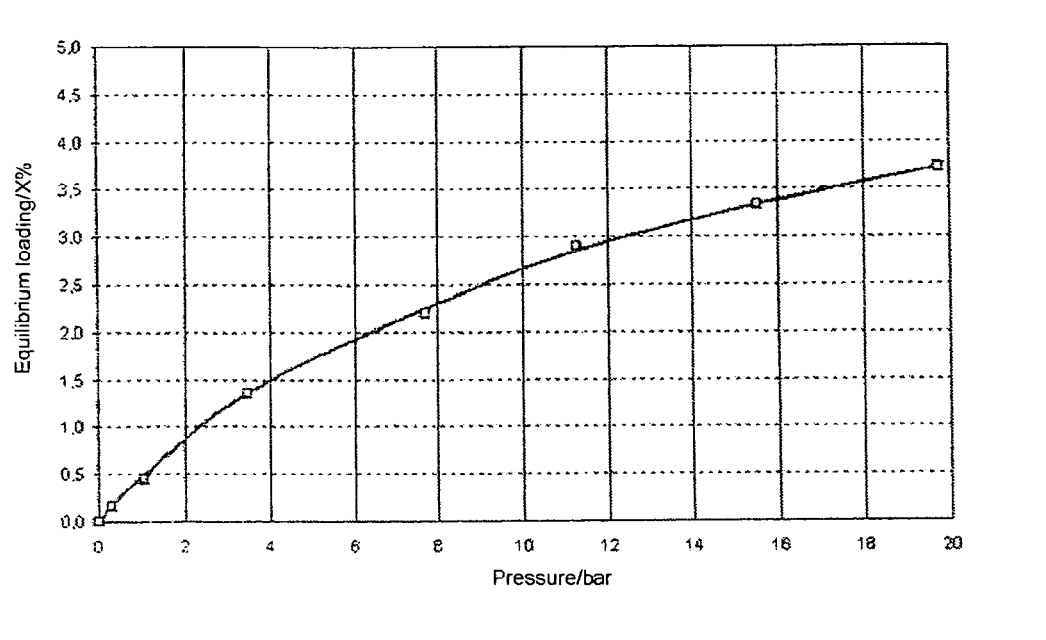
FIG. 1 shows the equilibrium distribution for methane adsorbed on 3 mm extrudates of the EMOF at 25° C.

The results are shown graphically in FIG. 1.

Example 2

Adsorption of $CO_2$ $CO_2$ was adsorbed on 3 mm extrudates of the EMOF at 25° C. The measurement was carried out in a customary balance. The sample was dried at 120° C. and a pressure of <1 mbar for about 20 hours. The EMOF had a surface area of 616 $m^2/g$.
The following values were determined:

| Eqd/% | Pressure/bar |
|---|---|
| 0 | 0.00 |
| 3.625 | 0.43 |
| 19.805 | 10.84 |
| 21.617 | 13.87 |
| 24.006 | 18.83 |
| 20.798 | 12.23 |
| 18.136 | 7.75 |
| 14.505 | 3.85 |
| 11.130 | 2.16 |

Figure 2:
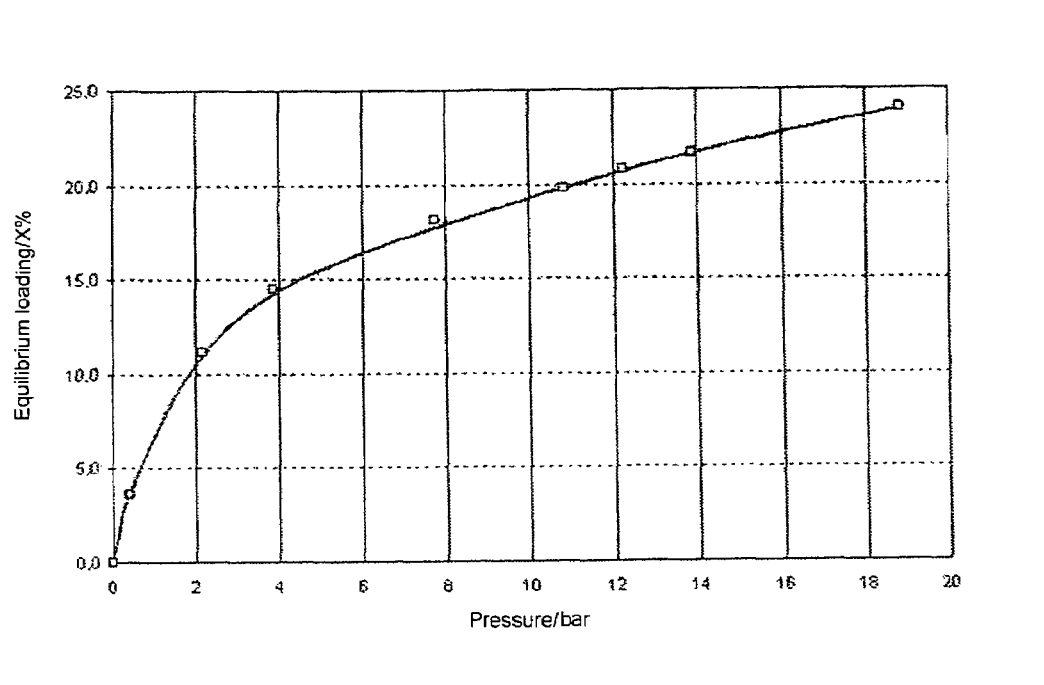
FIG. 2 shows the equilibrium distribution for carbon dioxide adsorbed on 3 mm extrudates of the EMOF at 25° C.

The results are shown graphically in FIG. 2.

Example 3

Sorption of Propene

Figure 3:
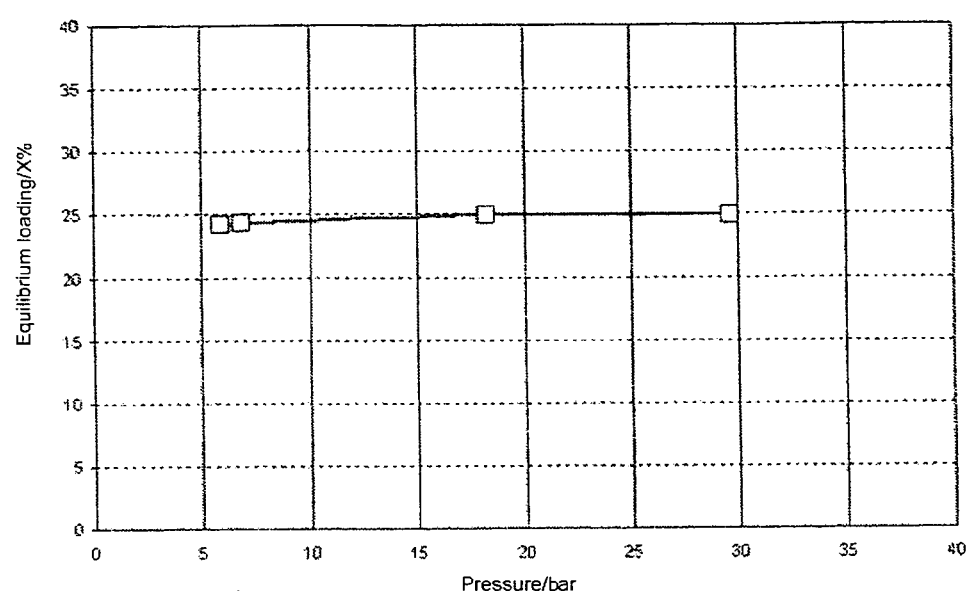
FIG. 3 shows the equilibrium distribution for propene adsorbed at 70° C.

Propene was sorbed at 70° C. The sample was dried in the balance at 70° C. for about 2.5 hours. The EMOF was in the form of powder and had a surface area of 1649 $m^2/g$.
The results are shown in FIG. 3.

Example 4 (Comparison)

Sorption of $CO_2$ on 13× Molecular Sieve $CO_2$ was sorbed at 25° C. The 13× molecular sieve was dried at 25° C. and <0.1 mbar for about 5 hours. The molecular sieve had a surface area of 730 $m^2/g$.
The following values were determined:

| Eqd/% | Pressure/bar |
|---|---|
| 0 | 0 |
| 9.01 | 0.10 |
| 14.18 | 0.29 |
| 20.60 | 7.50 |
| 19.52 | 6.61 |
| 20.75 | 14.58 |
| 21.51 | 21.39 |
| 21.79 | 31.21 |
| 21.81 | 38.69 |

Figure 4:
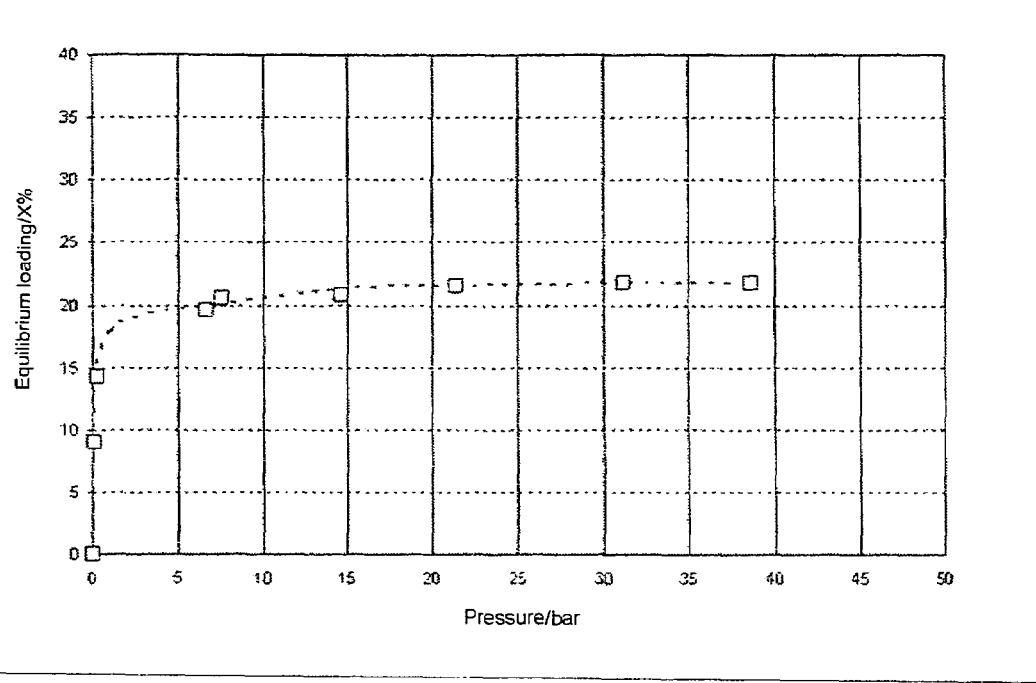
FIG. 4 shows the equilibrium distribution for carbon dioxide adsorbed on 13X molecular sieve at 25° C.

The results are shown graphically in FIG. 4.

Example 5

Sorption of Methane on Conventional (Not Electrochemically Prepared) MOF-5

Methane was adsorbed on 3 mm extrudates of the EMOF at 25° C. The measurement was carried out in a customary balance. The sample was dried at 120° C. and a pressure of <1 mbar for about 40 hours. The EMOF had a surface area of 2380 $m^2/g$.
The following values were determined:

| Eqd/% | Pressure/bar |
|---|---|
| 0 | 0.00 |
| 0.703 | 1.49 |
| 1.201 | 3.27 |
| 1.256 | 3.61 |
| 1.745 | 5.68 |
| 3.938 | 16.86 |
| 4.525 | 20.47 |

Figure 5:
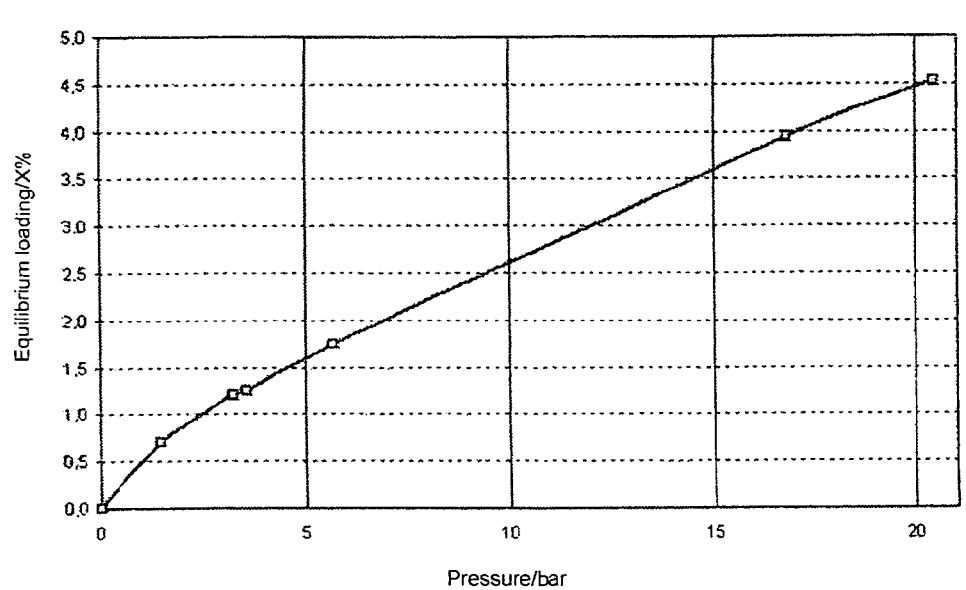
FIG. 5 shows the equilibrium distribution for methane adsorbed on conventional 3 mm extrudates of the EMOF at 25° C.

The results are reported in FIG. 5.

The invention claimed is:

1. A method of absorbing at least one gas, storing the at least one gas, or absorbing and storing the at least one gas wherein the at least one gas is brought into contact with an electrochemically prepared metal-organic framework under conditions suitable for absorption of the at least one gas, with absorption of the at least one gas into the metal-organic framework occurring, and, optionally, the conditions are subsequently changed so that release of the at least one gas occurs.

2. The method according to claim 1, wherein the at least one gas is selected from the group consisting of: saturated hydrocarbons, unsaturated hydrocarbons, saturated alcohols unsaturated alcohols, oxygen, nitrogen, the noble gases, CO, $CO_2$, synthesis gas, natural gases, compounds which generate the gases, and mixtures thereof.

3. The method according to claim 1, wherein the at least one gas is selected from the group consisting of $H_2$; $H_2$-comprising gas mixtures, $H_2$-producing compounds, $H_2$-releasing compounds, methane, ethane, propane, butanes, ethylene, propylene, acetylene, Ne, Ar, Kr, Xe, CO, $CO_2$ and mixtures thereof.

4. The method according to claim 1, wherein the method is a method of storage, and wherein the storage is carried out at a temperature of from 0 to 100° C.

5. The method according to claim 1, wherein the method is a method of storage, and wherein the storage is carried out at a pressure of from 1 to 300 bar (abs).

6. The method according to claim 1, wherein the method is a method of storage, wherein the method comprises subsequently changing the conditions so that the release of the at least one gas occurs, and wherein the stored at least one gas is released by reducing the pressure or increasing the temperature.

7. The method according to claim 1, wherein the metal-organic framework is present in a gastight container.

8. The method according to claim 7, wherein the container is connected to a fuel cell or is part of the fuel cell.

9. The method according to claim 8, wherein the fuel cell is part of a power station, motor vehicle or cable-less application in electronics.

10. The method according to claim 1, wherein the electrochemically prepared metal-organic framework comprises the at least one metal of groups Ia, IIa, IIIa, IVa to VIIIa and Ib and VIb, of the Periodic Table of the Elements.

11. The method according to claim 10, wherein the at least one metal is selected from the group consisting of Zn, Co, Ni, Pd, Pt, Ru, Rh, Fe, Mn, Ag Co, and combinations thereof.

12. A method of producing an electrochemically prepared metal-organic framework, comprising at least one gas, comprising contacting the gas with the framework, thereby producing the electrochemically prepared metal-organic framework comprising the at least one gas.

13. A metal-organic framework comprising at least one gas obtained by the method of claim 12.

14. A container or fuel cell comprising the metal-organic framework comprising at least one gas of claim 13 and a closure mechanism.

15. A system comprising the metal-oragnic framework comprising at least one gas according to claim 13.

16. A system comprising the fuel cell according to claim 14.

17. A method of forming a power station, a motor vehicle, a mobile telephone, or a laptop comprising forming the power station, the motor vehicle, the mobile telephone, of the laptop with the metal-organic framework comprising at least one gas of claim 13.

18. A method of storing and releasing energy in at least one apparatus wherein a supply of external energy is not possible or desirable comprising storing and releasing the energy with the fuel cell according to claim 14.

19. The method of claim 1, wherein the method is a method of absorbing.

20. The method of claim 1, wherein the method is a method of storing and absorbing.

* * * * *